United States Patent [19]

Swickley

[11] 3,938,555

[45] Feb. 17, 1976

[54] VALVE OVERRIDE APPARATUS

[75] Inventor: Louis A. Swickley, Cuyahoga Falls, Ohio

[73] Assignee: International Basic Economy Corporation, New York, N.Y.

[22] Filed: Mar. 21, 1974

[21] Appl. No.: 453,435

[52] U.S. Cl.. 137/625.67; 137/625.26; 137/625.64; 251/284; 251/130
[51] Int. Cl.² ..................... F16K 1/32; F15B 15/26
[58] Field of Search..... 137/625.26, 625.67, 614.19, 137/625.49, 625.64; 251/284, 285, 342, 297, 89, 130

[56] References Cited
UNITED STATES PATENTS

| | | | |
|---|---|---|---|
| 2,591,118 | 4/1952 | Bent | 137/625.67 |
| 2,638,108 | 5/1953 | Williams et al. | 137/625.26 X |
| 2,861,592 | 11/1958 | Collins | 137/625.64 |
| 3,043,327 | 7/1962 | Wakeman | 137/625.26 X |
| 3,168,353 | 2/1965 | Horowitz | 137/625.26 X |
| 3,519,312 | 7/1970 | Cruse | 137/625.67 X |
| 3,544,065 | 12/1970 | Mercier | 251/284 |
| 3,754,571 | 8/1973 | Bell | 137/614.19 |

FOREIGN PATENTS OR APPLICATIONS

| | | | |
|---|---|---|---|
| 238,856 | 10/1959 | Australia | 251/284 |

OTHER PUBLICATIONS

Valvair Corp., Non Locking Manual Override, Drawing K162-001, 14 Mar. 1960.

*Primary Examiner*—Martin P. Schwadron
*Assistant Examiner*—Robert J. Miller
*Attorney, Agent, or Firm*—Price, Heneveld, Huizenga & Cooper

[57] ABSTRACT

A fluid valve especially adapted for manually controlling pilot valves and other fluid valves. The manual override valve includes an axially slideably movable plunger which is contained and recessed within a fluid passageway in the valve. Slide bar positioning means are included for holding the plunger in a predetermined axial position to control fluid flow through the fluid passageway. The slide bar and plunger are color coded for visual determination of the plunger position. For safety considerations, the override valve requires two-hand operation using a probe smaller than the override valve passageway in which the plunger is mounted.

22 Claims, 8 Drawing Figures

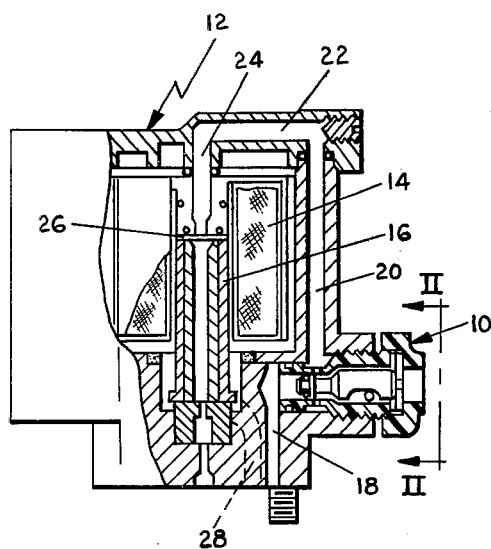
FIG. 1
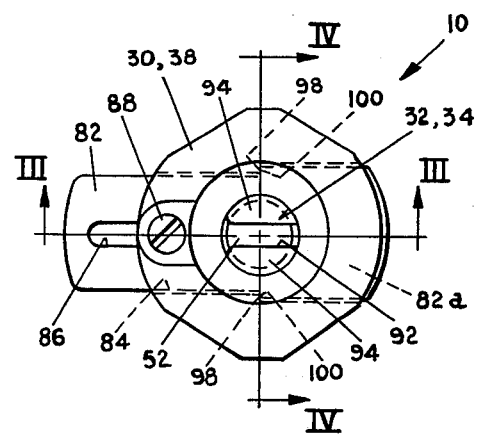
FIG. 2
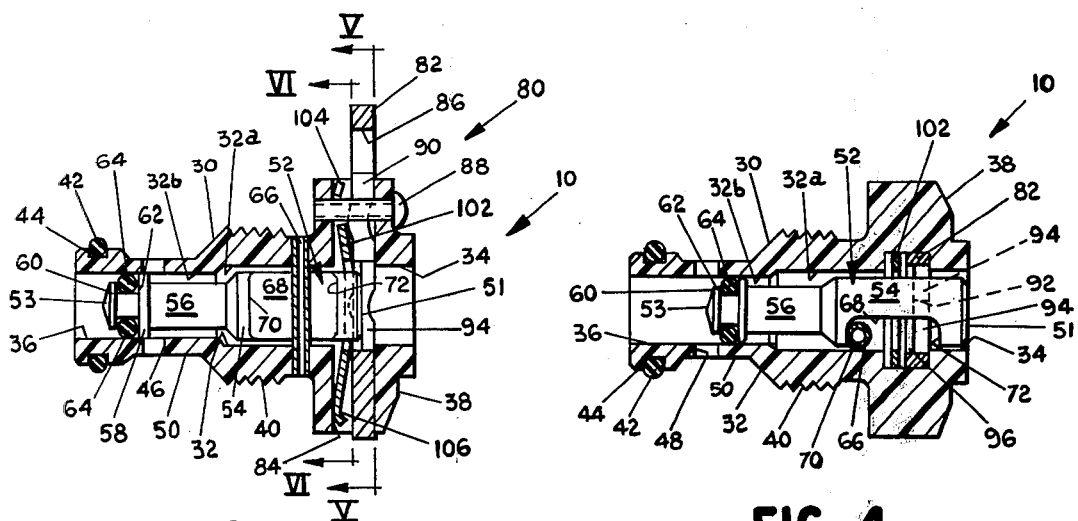
FIG. 3
FIG. 4
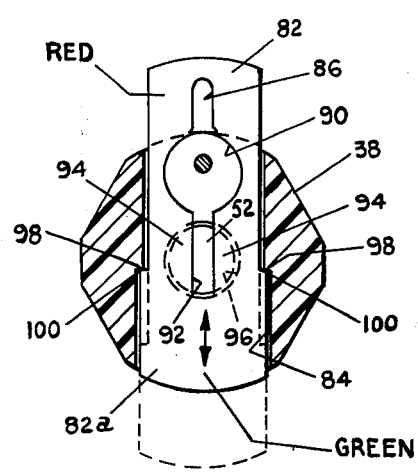
FIG. 5

VALVE OVERRIDE APPARATUS

BACKGROUND OF THE INVENTION

This invention relates to manually operated fluid valves for controlling the operation of other fluid valves and, more particularly, to a manually operated fluid valve which is designed to require two-hand operation to prevent accidental actuation.

Manually operated fluid valves for controlling the operation of other fluid valves are well known. Such valves have been used with pilot valves providing a manual substitution for the operation thereof in order to control a main fluid valve during set up, testing, or other operations of the main valve. However, I have discovered that such prior known override valves could be accidentally actuated making their use in certain applications less desirable.

First, prior known manual override valves for pilot valves have been operable using only one hand. Modern safety considerations dictate against such single-handed operation in order to prevent inadvertent operation of the main fluid valve. Similarly, the prior known valves could be inadvertently struck or bumped initiating operation of the main fluid valve and hence some piece of machinery controlled by that fluid valve at undesired times thereby creating a safety hazard.

It has also been discovered that it is advantageous in certain applications to provide means for locking an override valve in one position and to provide for simple removal of such locking apparatus. Although certain of the prior known valves could be locked in one position to continuously "override" a pilot valve, conversion of such prior valves to remove the locking apparatus was often extremely difficult and impractical.

Further, it has been found advantageous to determine the position of the manual override valve from a large distance away from the pilot and/or main valve. The actual valve position of the prior known override valves is extremely difficult to determine from any more than a short distance away.

Thus, I have determined the need for a valve which is capable of being converted from locking to nonlocking modes, which is compatible with safety requirements to prevent inadvertent operation thereof by bumping or with one hand, and which provides for accurate determination of its position from large distances away from the valve.

SUMMARY OF THE INVENTION

Accordingly, it is the purpose of the present invention to provide a manually operable override valve especially adapted for use with solenoid-operated pilot valves in order to manually control the operation of a main fluid valve with which the pilot valve is associated. The valve protrudes only minimally from the pilot valve and precludes either one hand or accidental operation thereof. The valve may be locked in its actuated position and the locking means are easily removable without removing the entire valve such that the valve cannot be locked. The valve may be momentarily actuated either with or without the locking apparatus. In addition, the valve is color coded such that its condition in either actuated or nonactuated positions is visually determinable quickly at a glance from great distances. Although especially useful in pilot valves, the invention, because it is a three-way valve, has a multitude of fluid power applications.

In the preferred embodiment, the override valve includes a first fluid passageway in which a plunger is slidably mounted. The plunger is axially movable between a first axial position in which one of its ends is contained within the first fluid passageway adjacent a surface of the valve body, and a second axial position in which the same end is recessed behind the said surface. Accidental or inadvertent operation of the plunger is precluded since none of the plunger structure protrudes beyond the valve body. In its two respective axial positions, the plunger permits and prevents fluid flow between one end of the first passageway and second, intersecting, fluid passageway.

Positioning means are also included for holding the plunger in its second axial position and for releasing the plunger such that it may move to its first axial position. Axial movement limiting means for retaining the plunger within the first passageway are also included.

In the preferred embodiment, the positioning means include a slide bar having a first aperture which allows the plunger to pass therethrough and a second aperture which allows access to the plunger for release from its second axial position. The end of the plunger, as well as the slide bar, are color coded such that the valve position may be determined quickly from large distances.

Either of two types of biasing means are utilized with the invention to hold the slide bar in its two positions. One embodiment includes a separate leaf spring fitted against the slide bar. The other embodiment includes a pair of elongated spring members formed integrally with the valve body.

These and other objects, advantages, purposes, and features of the invention will become more apparent from a study of the following description taken in conjunction with the drawings.

BRIEF DESCRIPTION OF THE DRAWINGS

FIG. 1 is a side elevation, partially broken away, illustrating the manual override valve invention in cross section and mounted within a typical, solenoid-operated, pilot valve;

FIG. 2 is a front elevation of a first embodiment of the manual override valve taken along plane II-II of FIG. 1;

FIG. 3 is a sectional view of the override valve taken along plane III—III of FIG. 2;

FIG. 4 is another sectional view of the valve taken generally transverse to the view shown in FIG. 3 along plane IV—IV of FIG. 2;

FIG. 5 is a sectional front elevation illustrating the slide bar positioning means taken along plane V—V of FIG. 3;

DESCRIPTION OF THE PREFERRED EMBODIMENT

Figure 7:
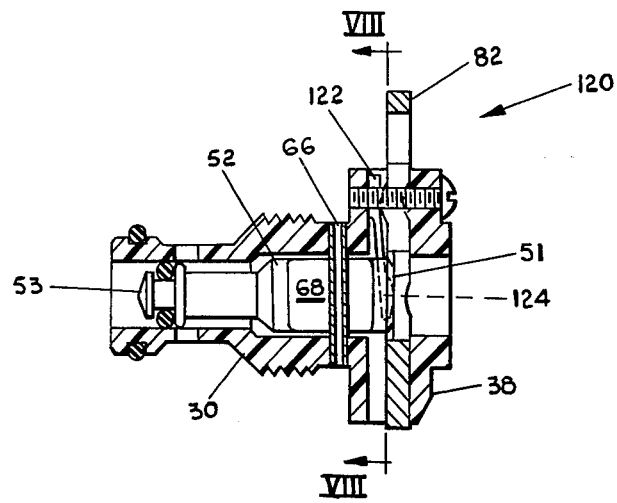
FIG. 7 is a sectional view of a second embodiment of the override valve.

Referring now to the drawings in greater detail, FIG. 1 illustrates a first embodiment of the manual override valve 10 mounted in a typical solenoid-operated pilot valve assembly 12. Pilot valve assembly 12 includes a solenoid 14 and a vertically reciprocable armature valve 16 within the core of the solenoid. When the solenoid 14 is not actuated, the armature valve 16 drops vertically into the position shown in FIG. 1. When in this position, fluid pressure is admitted through passageway 18, passes through the open override valve 10 and on through fluid passageways 20, 22, and 24. Fluid from passageway 24 passes through the opening 26 (since the armature has dropped) along the sides of armature 16, and on out through passageway 28 to a main fluid valve associated with the pilot valve (not shown). Electrical actuation of solenoid 14 pulls armature 16 up thereby closing opening 26 and preventing the fluid flow through the aforementioned passageways. However, without actuating solenoid 14, the flow through the several fluid passageways may be controlled with manual override valve 10 to block the fluid passage between passageways 18 and 20 as will be more fully described below.

As is best seen in FIGS. 2-4, the first embodiment of the manual override valve 10 includes an elongated valve body 30 including a longitudinal passageway or bore 32 extending from one end of the body to the other and including open ends 34 and 36. Body 30 has an enlarged head 38, threads 40 along its medial section for securing the body in the pilot valve 12 and an annular O-type sealing ring 42 mounted in a suitable recess 44 adjacent its end adapted to be received internally within pilot valve 12. A pair of cross passages or bores 46 (FIG. 3) and 48 (FIG. 4) circumferentially spaced 90° from one another extend through the valve body 30 at reduced diameter portion 50 thereof. Bores 46, 48 intersect the longitudinal passageway 32 to provide fluid communication therebetween. The longitudinal passageway 32 is circular in cross section and includes a larger diameter portion 32a passing through the head 38 of the valve body as well as a portion 32b having a lesser diameter extending from the end of the larger diameter portion 32a to the opposite end 36 past passageways 46 and 48.

Received within the longitudinal passageway 32 is an axially movable plunger 52 including ends 51 and 53 and two right cylindrical portions 54 and 56 each of which has a circular cross section. Section 56 is received within larger diameter portion 32a of longitudinal bore 32 while the smaller diameter cylinder 56 extends into the lesser diameter portion 32b of the longitudinal bore. Spaced shoulders 58 and 60 define an annular recess 62 adjacent end 53 of the plunger. Recess 62 receives an annular, toric, O-type sealing ring 64 as is best seen in FIGS. 3 and 4.

The diameters of portions 54 and 56 of plunger 52 are respectively less than the corresponding diameters of portions 32a and 32b of longitudinal bore 32. The diameter of annular shoulder 58 is slightly less than the diameter of portion 32b of the bore but larger than the diameter of cylindrical portion 56. Toric O-ring 64 is selected to be of a slightly greater outside diameter than the diameter of portion 32b such that it resiliently seals and prevents the flow of fluid through portion 32b when it is mounted in recess 62. When the plunger 52 is held in its closed or actuated position shown in FIG. 3, O-ring 64 prevents the passage of fluid between the cross bores or passageways 46 or 48 and the end 36 of the longitudinal passageway. However, when plunger 52 is in its nonactuated or open position (FIG. 4), the O-ring seals portion 32b of the passageway on the opposite side of the cross bores or passageways 46 and 48 such that fluid flow is prevented between those passageways and end 34 of the longitudinal bore. Fluid can thus flow between end 36 of bore 32 and passageways 46 and 48 when the plunger is in its open position. It will be understood that when the plunger is in its closed position (FIG. 3), fluid may exhaust from passageways 46 and 48 along the sides of the plunger and out opening 34 in the longitudinal bore. Such operation is known as "3-way" operation in the field of fluid valves.

In order to limit the axial movement of plunger 52 in bore 32, a pin 66 is received in a suitable aperture extending transversely through the valve body 30 and through an elongated slot 68 formed in one side of the larger diameter portion 54 of plunger 52. Slot 68 may be formed in the center or on the opposite side of plunger 52. Pin 66 will be accordingly positioned depending on the location of the slot in the plunger. Slot 68 includes ends 70 and 72. When end 70 contacts the side of pin 66 as shown in FIG. 4, plunger end 51 is flush with the end of the valve body as shown and prevents plunger 52 from sliding out of bore 32. Similarly, end 72 contacting the opposite side of pin 66 prevents the plunger from sliding out of passageway 32 beyond its closed position shown in FIG. 3. Normally, however, end 72 does not contact the side of pin 66 in the closed position since fluid pressure in passageway 18 of the pilot valve against end 53 of the plunger and forces the plunger against a portion of the slide bar positioning means 80 as will be more fully described hereinafter.

As is best seen in FIGS. 2, 3, and 5, the slide bar positioning means for holding plunger 52 in its closed or actuated position (FIG. 3) include an elongated slide bar 82 slidably reciprocally mounted in a slot 84 extending entirely through enlarged head 38 of valve body 30. Slide bar 82 includes a series of interconnected apertures 86, 90, and 92. These apertures limit the reciprocal movement of the slide bar, allow passage of the plunger therethrough to its open position (FIG. 4), and hold the plunger in its actuated or closed position (FIG. 3).

Slot 86 receives a reciprocation-limiting, screw 88 at the top of enlarged head 38. Slot 86 flares into circular aperture 90 which has a cross-sectional area sufficiently large to allow the passage of the larger diameter portion 54 of plunger 52 therethrough. Circular aperture 90 continues into elongated slot 92 opposite slot 86. Slot 92 is formed by two flanges 94 of a thickness less than that of the remainder of slide bar 82, which flanges extend from the opposite sides of a circular recess 96 on the rear side of the slide bar. Recess 96 has a diameter slightly larger than that of the largest diameter portion 54 of plunger 52 such that the end 51 of plunger 52 seats therein as shown in FIG. 3 when the plunger is in its closed or actuated position.

Slide bar 82 also includes a wider portion 82a at the bottom thereof (see FIGS. 2 and 5) forming shoulders 98 on either side of the slide bar. Shoulders 98 abut shoulders 100 formed in slot 84 such that sliding movement of the slide bar is halted exactly when slot 92 and recess 96 are in alignment with the plunger 52. Limitation on the sliding movement in the opposite direction is provided by the abutment of screw 88 with the closed end of the slot 86.

One of two types of biasing means are included in positioning means 80 to bias the slide bar against the forward side of slot 84 to hold the slide bar either (a) with circular aperture 90 in alignment with the plunger or (b) with slot 92 in alignment with the plunger and shoulders 98 and 100 abutting one another. The two types of biasing means account for the sole difference between the two embodiments of the invention.

Figures 6, 8:
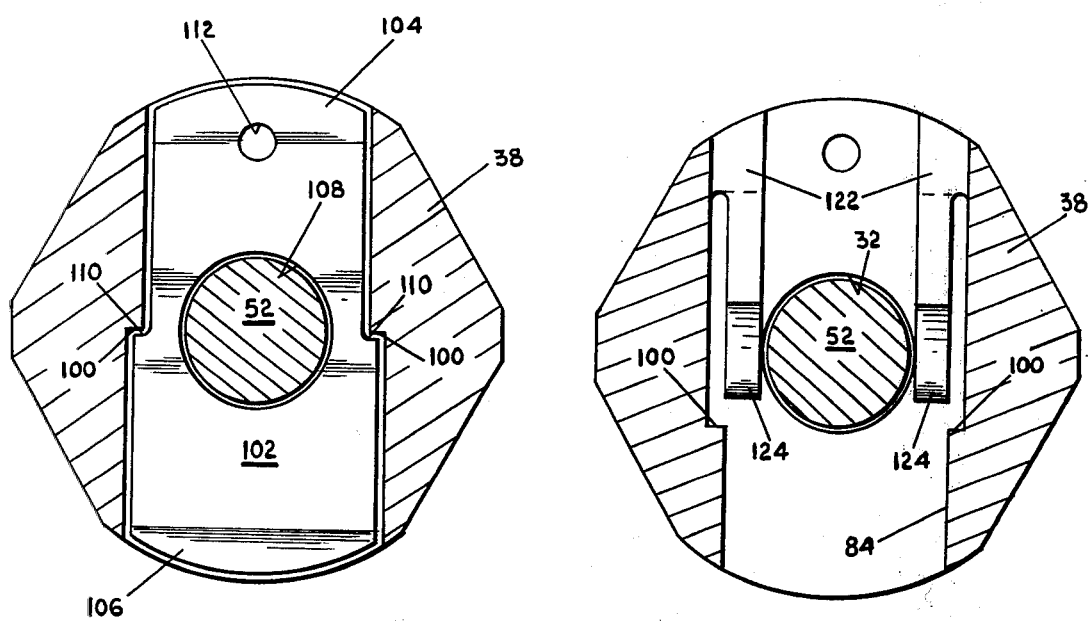
FIG. 6 is another sectional front elevation illustrating one form of the biasing means for the slide bar taken along plane VI—VI of FIG. 3.
FIG. 8 is a sectional front elevation of the valve embodiment of FIG. 7 illustrating another form of the biasing means for the slide bar taken along plane VIII-—VIII of FIG. 7.

The first embodiment of the invention (shown in FIGS. 1–6) includes a separate formed, leaf spring 102 best seen in FIGS. 3 and 6. Leaf spring 102 has a general cross-sectional shape of a shallow V with the ends 104 and 106 of the spring being turned outwardly. An aperture 108 is formed in the center section of the spring and has a diameter sufficiently large to allow the largest diameter portion 54 of plunger 52 to pass therethrough. Shoulders 110 are included on either side of the spring to locate it appropriately with respect to shoulders 100 and slots 84. A small aperture 112 is provided in the upper portion of the spring to locate the spring with respect to set screw 88. As will be seen in FIG. 3, the medial portion of the spring engages the slide bar on either side of the plunger and forces it against the forward side of slot 84 with sufficient force to hold it in position. The force of the spring is only large enough to hold the slide bar in the desired position and does not obstruct sliding movement of the slide bar.

Referring to FIGS. 7 and 8, a second embodiment 120 of the manual override valve is illustrated including a second form of biasing means for the slide bar 82. Embodiment 120 is similar in all respects to embodiment 10 of the manual override valve including valve body 30, plunger 52, and slide bar 82. The second type of biasing means includes a pair of elongated spring members 122 formed within slot 84. As seen in FIGS. 7 and 8, spring members 122 are molded integrally with the valve body 30 and extend from the upper portion of slot 84 outwardly and downwardly through slot 84 on either side of plunger 52. Members 122 include outwardly rounded portions 124 (FIG. 7) on the ends thereof which rounded portions engage the rear surface of the slide bar biasing it against the forward side of slot 84 to hold it in the desired position. Spring members 122 are molded simultaneously from the same material as valve body 30.

An additional aspect of the invention is that the end 51 of the plunger 52, as well as the slotted bar 82, are color coded for visible determination of the position of the plunger 52 from large distances. The plunger face 51, as well as the lower portion of the slide bar extending approximately from the lower boundary of circular aperture 90 to the bottom of portion 82a of the slide bar, are both tinted green. Accordingly, when the plunger is in its open position with face 51 flush with the end of the valve body 30 and with circular aperture 90 in slide bar 82 in alignment with the plunger such that lower portion 82a protrudes below the enlarged head 38 (shown in phantom in FIG. 5), the green portions will be highly visible to anyone from a great distance thereby indicating that the valve is open. In this position, the plunger 52 may be momentarily depressed for actuation of the main fluid valve associated with the pilot valve in which the override valve 10 or 120 is mounted by using any suitable probe or instrument of a size smaller than the diameter of longitudinal bore 32. Fluid pressure acting against the end 53 of plunger 52 from passageway 18 (FIG. 1) will return the plunger 52 to its open position (FIG. 4) preventing the exhaust of any fluid through opening 34 of bore 32.

The closing and locking of valve 10 or 120 requires the use of two hands. Plunger 52 is moved axially toward end 36 of bore 32 with one hand again using a probe smaller than bore 32 while the other hand is used to slide slide bar 82 to the position shown in FIG. 3. Fluid pressure from fluid passageway 18 forces plunger 52 back toward end 34 of bore 32 after movement of bar 82 such that end 51 seats in circular recess 96 in the manner described above.

When locked in this actuated position, the upper end of slide bar 82 is visible (FIGS. 2, 3, and 5) and is tinted red indicating the valve is closed. When the red end of bar 52 is visible, the green tinted end 82a of bar 82, as well as the face 51 of plunger 52, are both depressed and hidden from view. The protruding red end of bar 82 is visible from large distances. The slide bar cannot be moved when end 51 is seated in recess 96 and the only method for returning the plunger to its open position is to again utilize a probe smaller than the width of slot 92 to force the plunger rearwardly against the fluid pressure acting on end 53. At the same time, the operator's other hand is used to return the slide bar to its other position with circular aperture 90 in alignment with the plunger.

Preferably, valve body 30 and plunger 52 are molded from a high-strength, wear-resistant, resilient synthetic, thermoplastic material such as nylon plastic filled with 30 per cent glass fibers dispersed therethrough to reduce creep in the molded members. In embodiment 120 of the valve, the spring members 122 are integrally molded simultaneously with valve body 30 from this same material. Plunger 52 may also be made from machined aluminum and other plastics or metals. Leaf spring 102 is preferably formed from a resilient, spring material such as phosphor bronze, Sae No. 77C.

Accordingly, it will now be understood that either embodiment 10 or 120 of the manual override valve provides a safe, easy-to-use three-way manual override for pilot and other fluid valves. Accidental actuation of the valve is prevented by the recess of the plunger 52 within bore 32 although the valve may be quickly and simply actuated with the insertion of a probe smaller than the bore. The slide bar positioning means holds the plunger in its actuated position. The color coding of the plunger and slide bar provide a highly visible means for determining the position of the plunger quickly, at a glance, from large distances.

While several forms of the invention have been shown and described, other forms will now be apparent to those skilled in the art. Therefore, it will be understood that the embodiments shown in the drawings and described above are merely for illustrative purposes and are not intended to limit the scope of the invention as defined by the claims which follow.

The embodiments of the invention in which an exclusive property or privilege is claimed are defined as follows:

1. A fluid valve means for manually controlling the operation of another fluid valve comprising: a valve body portion having a first passageway terminating at one end at a surface and at the other end adapted to communicate with a fluid source; a second fluid passageway intersecting said first passageway and adapted to communicate with a fluid passageway of the fluid valve it is adapted to control; a plunger axially movably mounted in said first passageway and being movable between a first axial position in which one of its ends is contained within said first passageway adjacent to the said surface of said valve body and a second axial position in which said one end is recessed behind said surface of said body; said plunger in said first axial position permitting fluid flow between said other end of said first passageway and said second passageway, and said plunger in said second axial position preventing fluid flow between said other end of said first passageway and said second passageway; positioning means for holding said plunger in said second axial position; and axial movement limiting means for preventing said plunger from extending out of said first passageway; said positioning means including an elongated member slidably mounted for movement between first and second positions across the path of axial movement of said plunger; said member including a pair of apertures, one of said two apertures having a width less than the width of said plunger, said one aperture being in axial alignment with said plunger when said member is in said second position and said plunger is in said second axial position, the other of said two apertures being in alignment with said plunger when said member is in said first position and said plunger is in said first axial position.

2. The fluid valve of claim 1 wherein said body portion includes a slot extending therethrough generally transverse to said first fluid passageway; said elongated member comprising a slide bar mounted in said slot and including means for limiting the sliding movement thereof to said two positions in said slot; biasing means in said slot for holding said slide bar in said two positions.

3. The fluid valve of claim 2 wherein said biasing means includes a leaf spring secured in said slot.

4. The fluid valve of claim 2 wherein said biasing means includes at least one elongated spring member in said slot, said spring member being formed integrally with said valve body.

5. The fluid valve of claim 1 wherein said elongated member includes two ends, one end having a first color and visibly projecting from one side of said body when said slide bar is in said second position and said one aperture is aligned with said plunger; said other end having a second color and visibly projecting from the opposite side of said body when said slide bar is in said first position and said second aperture is aligned with said plunger; said one end of said plunger also having said second color.

6. The fluid valve of claim 1 wherein said elongated member includes a recess located adjacent the periphery of said one aperture for receiving said one end of said plunger.

7. The fluid valve of claim 1 wherein said plunger includes a portion having a cross-sectional area smaller than the cross-sectional area of the portion of said first passageway receiving said portion whereby fluid can exhaust from said second passageway around said plunger portion and out of said one end of said first passageway when said plunger is in said second axial position.

8. The fluid valve of claim 1 wherein said plunger has a longitudinal axis; said axial movement limiting means comprising an elongated slot extending generally parallel to said longitudinal axis of said plunger and a pin extending through said body and said slot.

9. A manual override fluid valve for controlling other valves comprising a body having a longitudinal bore passing therethrough with first and second open ends and a cross bore passing transversely through said body and intersecting said longitudinal bore; a plunger axially movably mounted in said longitudinal bore, said plunger having first and second ends and being movable between a first axial position in which its first end is contained within said longitudinal bore adjacent said first open end thereof and a second axial position in which said first end is recessed behind said first open end, said plunger in said first axial position permitting fluid flow between said second end of said longitudinal bore and said cross bore, and said plunger in said second axial position preventing fluid flow between said second end of said longitudinal bore and said cross bore; positioning means for holding said plunger in said second axial position including slidable means movable between first and second positions for engaging said first end of said plunger, said slidable means being mounted for reciprocation across and through said longitudinal bore and including an aperture allowing access to said plunger through said longitudinal bore but holding said plunger in said second axial position when said slidable means is in said second position; and means for limiting the axial movement of said plunger for preventing said plunger from extending out of either end of said longitudinal bore.

10. The override valve of claim 9 wherein a portion of said plunger has a cross-sectional area less than the cross-sectional area of the portion of said longitudinal bore receiving said portion of said plunger whereby fluid can pass through said longitudinal bore and out said first open end around said plunger.

11. The override valve of claim 10 wherein said portion of said longitudinal bore has a circular cross section; said portion of said plunger being a right circular cylinder having a diameter less than the diameter of said portion of said longitudinal bore.

12. The override valve of claim 9 wherein said plunger includes an annular sealing member mounted adjacent said second end of said plunger.

13. The override valve of claim 9 wherein said plunger has a longitudinal axis; said axial movement limiting means comprising an elongated slot extending generally parallel to said longitudinal axis of said plunger and a pin extending through said body and said slot.

14. The override valve of claim 9 wherein said positioning means and slidable means comprise a slot extending generally transverse to said longitudinal bore through said body, a slide bar mounted for sliding movement in said transverse slot and extending out of said body, said slide bar including said aperture and a second sperture, said second aperture having a cross-sectional area larger than that of said plunger whereby said plunger can pass therethrough; means for biasing said slide bar against one side of said transverse slot; and means for limiting the sliding movement of said slide bar in said transverse slot whereby said first end of said plunger can move to a position flush with said first open end of said longitudinal bore when said slide bar is in said first position and said second aperture is in alignment with said plunger.

15. The override valve of claim 14 wherein said aperture is a slot extending through said slide bar and having a width less than the width of said plunger.

16. The override valve of claim 14 wherein said sliding movement limiting means for said slide bar include abutting shoulders on said transverse slot and said slide bar.

17. The override valve of claim 14 wherein said slide bar includes two ends, one end having a first color and visibly projecting from one side of said body when said slide bar is in said second position and said one aperture is aligned with said plunger; said other end having a second color and visibly projecting from the opposite side of said body when said slide bar is in said first position and said second aperture is aligned with said plunger; said first end of said plunger also having said second color.

18. The override valve of claim 14 wherein said biasing means include a leaf spring secured in said transverse slot, said leaf spring including an aperture allowing said plunger to pass therethrough.

19. The override valve of claim 14 wherein said biasing means includes a pair of elongated spring members formed integrally with said body in said transverse slot, said spring members projecting into said slot from one side thereof on either side of said plunger.

20. The override valve of claim 14 wherein said body and said spring members are molded integrally together from a snythetic plastic material.

21. The override valve of claim 9 wherein said aperture in said slidable means has a width less than the widths of both said longitudinal bore and said plunger.

22. The override valve of claim 9 wherein said slidable means includes a recess located adjacent and around the periphery of said aperture on the surface of said slidable means facing said plunger for receiving said first end of said plunger when said plunger is in said second axial position.

* * * * *